(12) United States Patent
Wang et al.

(10) Patent No.: US 12,592,851 B2
(45) Date of Patent: Mar. 31, 2026

(54) INFORMATION TRANSMISSION METHOD AND COMMUNICATION APPARATUS

(71) Applicant: HUAWEI TECHNOLOGIES CO., LTD., Shenzhen (CN)

(72) Inventors: Ting Wu Wang, Singapore (SG); Ju Yan Pan, Singapore (SG); Zhaohui Cai, Singapore (SG); Ruinan Deng, Shenzhen (CN); Huawei Yue, Shanghai (CN); Yunshuai Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 18/619,852

(22) Filed: Mar. 28, 2024

(65) Prior Publication Data

US 2024/0243961 A1 Jul. 18, 2024

Related U.S. Application Data

(63) Continuation of application No. PCT/CN2021/122458, filed on Sep. 30, 2021.

(51) Int. Cl.
*H04L 27/38* (2006.01)
*H04L 5/00* (2006.01)
*H04L 27/26* (2006.01)

(52) U.S. Cl.
CPC ........ *H04L 27/3872* (2013.01); *H04L 5/0092* (2013.01); *H04L 27/2628* (2013.01)

(58) Field of Classification Search
CPC .............. H04L 27/3872; H04L 5/0092; H04L 27/2628; H04L 2027/0018;
(Continued)

(56) References Cited

U.S. PATENT DOCUMENTS 10,075,210 B2 9/2018 Marrow et al.
2021/0007083 A1* 1/2021 Yoon ................. H04L 27/26536

FOREIGN PATENT DOCUMENTS

CN 109391578 A 2/2019
CN 110474860 A 11/2019
WO 2019113339 A1 6/2019

OTHER PUBLICATIONS

Qualcomm Incorporated:"Remaining details on synchronization signal design", 3GPP TSG-RAN WG1 Meeting AH 1801, Vancouver, Canada, Jan. 22-26, 2018, R1-1800846, total 8 pages.
(Continued)

*Primary Examiner* — David S Huang
(74) *Attorney, Agent, or Firm* — WOMBLE BOND DICKINSON (US) LLP

(57) ABSTRACT

A method includes: determining a plurality of first subcarrier data items on a plurality of first subcarriers of a first frequency subband; performing first phase rotation on each first subcarrier data item based on a mixing frequency and a first reference frequency corresponding to the first frequency subband; determining a to-be-transmitted signal based on a plurality of first subcarrier data items obtained through first phase rotation; and sending the to-be-transmitted signal. In this way, phase rotation can be performed based on at least the first reference frequency, so that modulation can be correctly implemented without a need to know a mixing frequency of a receiving end. In addition, there is no need to notify the receiving end of the used mixing frequency, and the receiving end can correctly demodulate a received signal even if the receiving end does not know the mixing frequency.

14 Claims, 6 Drawing Sheets

(58) Field of Classification Search
CPC ......... H04L 2027/0085; H04L 27/0014; H04L 27/2621; H04L 27/2634; H04L 27/26362; H04L 27/368; H04L 27/26
See application file for complete search history.

(56) References Cited

OTHER PUBLICATIONS

P802.15.4z™M/D05 Draft Standard for Low-Rate Wireless Networks Amendment: Enhanced Ultra Wide-Band (UWB) Physical Layers (PHYs) and Associated Ranging Techniques, Copyright @ 2019 by The Institute of Electrical and Electronics Engineers, Inc.total 180 pages.

IEEE Std 802.11™-2012 IEEE Standard for Information technology-Telecommunications and information exchange between systems Local and metropolitan area networks-Specific requirements Part 11:Wireless LAN Medium Access Control (MAC) and Physical Layer (PHY) Specifications, IEEE Computer Society, Sponsored by the LAN/MAN Standards Committee,Mar. 29, 2012,total 2793 pages.

IEEE Std 802. 15.4™-2015(Revision of IEEE Std 802.15.4-2011), IEEE Standard for Low-Rate Wireless Networks,IEEE Computer Society,Sponsored by the LAN/MAN Standards Committee,total 709 pages.

* cited by examiner

100

110

Transmitting end

112

S/P conversion module

114

IFFT module

116

Add GI module

Radio channel

130

120

Receiving end

P/S conversion module

FFT module

Remove GI module

126

124

122

200

210

First device

220

Second device

210

220

INFORMATION TRANSMISSION METHOD AND COMMUNICATION APPARATUS

CROSS-REFERENCE TO RELATED APPLICATIONS

This application is a continuation of International Application No. PCT/CN2021/122458, filed on Sep. 30, 2021, the disclosure of which is hereby incorporated by reference in its entirety.

TECHNICAL FIELD

Embodiments of the present disclosure mainly relate to the communication field, and more specifically, to an information transmission method and a communication apparatus.

BACKGROUND

An orthogonal frequency division multiplexing (OFDM) technology is developed from a multi-carrier modulation (MCM) technology. The OFDM technology is a modulation technology and also a multiplexing technology.

In an existing OFDM system, mixing frequency matching needs to be first performed between a transmitting end and a receiving end. In other words, the transmitting end and the receiving end each need to know a mixing frequency of the peer end. Consequently, additional signaling overheads are caused and system complexity is increased.

SUMMARY

Embodiments of the present disclosure provide an information transmission solution. A transmitting end and a receiving end do not need to know a mixing frequency of the peer end. Therefore, signaling overheads can be reduced.

According to a first aspect of the present disclosure, an information transmission method is provided. The method includes: determining a plurality of first subcarrier data items on a plurality of first subcarriers of a first frequency subband; performing first phase rotation on each of the plurality of first subcarrier data items based on a mixing frequency and a first reference frequency corresponding to the first frequency subband; determining a to-be-transmitted signal based on a plurality of first subcarrier data items obtained through first phase rotation; and sending the to-be-transmitted signal.

In this way, in embodiments of the present disclosure, phase rotation can be performed at a transmitting end based at least on the first reference frequency, so that modulation can be correctly implemented without a need to know a mixing frequency of a receiving end. In addition, the transmitting end does not need to notify the receiving end of the used mixing frequency, and the receiving end can correctly demodulate the received signal even if the receiving end does not know the mixing frequency. In this way, there is no need to perform mixing frequency alignment between the transmitting end and the receiving end in advance. Therefore, additional signaling overheads are avoided, system complexity is reduced, and transmission efficiency is improved.

In some embodiments, the performing first phase rotation includes: determining a first phase rotation value based on a difference between the mixing frequency and the first reference frequency; and performing the first phase rotation on each of the plurality of first subcarrier data items based on the first phase rotation value.

In this way, phase rotation can be performed based on the difference between the mixing frequency and the first reference frequency. Therefore, phase deviation compensation is implemented.

In some embodiments, the method further includes: determining a plurality of second subcarrier data items on a plurality of second subcarriers of a second frequency subband, where the first frequency subband does not overlap the second frequency subband in frequency domain; and performing second phase rotation on each of the plurality of second subcarrier data items based on the mixing frequency and a second reference frequency corresponding to the second frequency subband, where the first reference frequency is different from the second reference frequency.

In this way, in embodiments of the present disclosure, phase rotation may be separately performed on a plurality of frequency subbands. Therefore, accuracy of processing a transmitted signal can be improved.

In some embodiments, the performing second phase rotation includes: determining a second phase rotation value based on a difference between the mixing frequency and the second reference frequency; and performing the second phase rotation on each of the plurality of second subcarrier data items based on the second phase rotation value.

In some embodiments, the determining a to-be-transmitted signal includes determining the to-be-transmitted signal based on the plurality of first subcarrier data items obtained through first phase rotation and a plurality of second subcarrier data items obtained through second phase rotation.

According to a second aspect of the present disclosure, an information transmission method is provided. The method includes: receiving a transmitted signal; determining a plurality of first subcarrier data items on a plurality of first subcarriers of a first frequency subband based on the transmitted signal; performing first phase reverse rotation on the plurality of first subcarrier data items based on a mixing frequency and a first reference frequency corresponding to the first frequency subband; and performing post-processing on a plurality of first subcarrier data items obtained through first phase reverse rotation.

In this way, in embodiments of the present disclosure, phase reverse rotation can be performed based at least on the first reference frequency, so that a received signal can be correctly demodulated without knowing a mixing frequency of a transmitting end. In this way, there is no need to perform mixing frequency alignment between the transmitting end and a receiving end in advance. Therefore, additional signaling overheads are avoided, system complexity is reduced, and transmission efficiency is improved.

In some embodiments, the performing first phase reverse rotation includes: determining a first phase reverse rotation value based on a difference between the first reference frequency and the mixing frequency; and performing the first phase reverse rotation on each of the plurality of first subcarrier data items based on the first phase reverse rotation value.

In some embodiments, the method further includes: determining a plurality of second subcarrier data items on a plurality of second subcarriers of a second frequency subband based on the transmitted signal, where the first frequency subband does not overlap the second frequency subband in frequency domain; and performing second phase reverse rotation on the plurality of second subcarrier data items based on the mixing frequency and a second reference frequency corresponding to the second frequency subband, where the first reference frequency is different from the second reference frequency.

In this way, in embodiments of the present disclosure, phase reverse rotation may be separately performed on a plurality of frequency subbands. Therefore, phase deviation compensation can be separately performed based on different reference frequencies. Therefore, accuracy of processing a transmitted signal is improved.

In some embodiments, the performing second phase reverse rotation includes: determining a second phase reverse rotation value based on a difference between the second reference frequency and the mixing frequency; and performing the second phase reverse rotation on each of the plurality of second subcarrier data items based on the second phase reverse rotation value.

According to a third aspect of the present disclosure, a communication apparatus is provided. The apparatus includes a first determining unit configured to determine a plurality of first subcarrier data items on a plurality of first subcarriers of a first frequency subband, a phase rotation unit configured to perform first phase rotation on each of the plurality of first subcarrier data items based on a mixing frequency and a first reference frequency corresponding to the first frequency subband, a second determining unit configured to determine a to-be-transmitted signal based on a plurality of first subcarrier data items obtained through first phase rotation, and a sending unit configured to send the to-be-transmitted signal.

In some embodiments, the phase rotation unit is configured to: determine a first phase rotation value based on a difference between the mixing frequency and the first reference frequency; and perform the first phase rotation on each of the plurality of first subcarrier data items based on the first phase rotation value.

In some embodiments, the first determining unit is further configured to determine a plurality of second subcarrier data items on a plurality of second subcarriers of a second frequency subband, where the first frequency subband does not overlap the second frequency subband in frequency domain; and the phase rotation unit is further configured to perform second phase rotation on each of the plurality of second subcarrier data items based on the mixing frequency and a second reference frequency corresponding to the second frequency subband, where the first reference frequency is different from the second reference frequency.

In some embodiments, the phase rotation unit is configured to: determine a second phase rotation value based on a difference between the mixing frequency and the second reference frequency; and perform the second phase rotation on each of the plurality of second subcarrier data items based on the second phase rotation value.

In some embodiments, the second determining unit is configured to determine the to-be-transmitted signal based on the plurality of first subcarrier data items obtained through first phase rotation and a plurality of second subcarrier data items obtained through second phase rotation.

According to a fourth aspect of the present disclosure, a communication apparatus is provided. The apparatus includes a receiving unit configured to receive a transmitted signal, a determining unit configured to determine a plurality of first subcarrier data items on a plurality of first subcarriers of a first frequency subband based on the transmitted signal, a phase reverse rotation unit configured to perform first phase reverse rotation on the plurality of first subcarrier data items based on a mixing frequency and a first reference frequency corresponding to the first frequency subband, and a post-processing unit configured to perform post-processing on a plurality of first subcarrier data items obtained through first phase reverse rotation.

In some embodiments, the phase reverse rotation unit is configured to: determine a first phase reverse rotation value based on a difference between the first reference frequency and the mixing frequency; and perform the first phase reverse rotation on each of the plurality of first subcarrier data items based on the first phase reverse rotation value.

In some embodiments, the determining unit is further configured to determine a plurality of second subcarrier data items on a plurality of second subcarriers of a second frequency subband based on the transmitted signal, where the first frequency subband does not overlap the second frequency subband in frequency domain; and the phase reverse rotation unit is further configured to perform second phase reverse rotation on the plurality of second subcarrier data items based on the mixing frequency and a second reference frequency corresponding to the second frequency subband, where the first reference frequency is different from the second reference frequency.

In some embodiments, the phase reverse rotation unit is configured to: determine a second phase reverse rotation value based on a difference between the second reference frequency and the mixing frequency; and perform the second phase reverse rotation on each of the plurality of second subcarrier data items based on the second phase reverse rotation value.

According to a fifth aspect of the present disclosure, a communication apparatus is provided. The communication apparatus includes a processor, a transceiver, and a memory. The memory stores instructions executable by the processor. When the instructions are executed by the processor, the communication apparatus is enabled to: determine a plurality of first subcarrier data items on a plurality of first subcarriers of a first frequency subband; perform first phase rotation on each of the plurality of first subcarrier data items based on a mixing frequency and a first reference frequency corresponding to the first frequency subband; determine a to-be-transmitted signal based on a plurality of first subcarrier data items obtained through first phase rotation; and send the to-be-transmitted signal by using the transceiver.

In some embodiments, the processor executes the instructions to enable the communication apparatus to: determine a first phase rotation value based on a difference between the mixing frequency and the first reference frequency; and perform the first phase rotation on each of the plurality of first subcarrier data items based on the first phase rotation value.

In some embodiments, the processor executes the instructions to enable the communication apparatus to: determine a plurality of second subcarrier data items on a plurality of second subcarriers of a second frequency subband, where the first frequency subband does not overlap the second frequency subband in frequency domain; and perform second phase rotation on each of the plurality of second subcarrier data items based on the mixing frequency and a second reference frequency corresponding to the second frequency subband, where the first reference frequency is different from the second reference frequency.

In some embodiments, the processor executes the instructions to enable the communication apparatus to: determine a second phase rotation value based on a difference between the mixing frequency and the second reference frequency; and perform the second phase rotation on each of the plurality of second subcarrier data items based on the second phase rotation value.

5

6

In some embodiments, the processor executes the instructions to enable the communication apparatus to: determine the to-be-transmitted signal based on the plurality of first subcarrier data items obtained through first phase rotation and a plurality of second subcarrier data items obtained through second phase rotation.

According to a sixth aspect of the present disclosure, a communication apparatus is provided. The communication apparatus includes a processor, a transceiver, and a memory. The memory stores instructions executable by the processor. When the instructions are executed by the processor, the communication apparatus is enabled to: receive a transmitted signal by a transceiver; determine a plurality of first subcarrier data items on a plurality of first subcarriers of a first frequency subband based on the transmitted signal; perform first phase reverse rotation on the plurality of first subcarrier data items based on a mixing frequency and a first reference frequency corresponding to the first frequency subband; and perform post-processing on a plurality of first subcarrier data items obtained through first phase reverse rotation.

In some embodiments, the processor executes the instructions to enable the communication apparatus to: determine a first phase reverse rotation value based on a difference between the first reference frequency and the mixing frequency; and perform the first phase reverse rotation on each of the plurality of first subcarrier data items based on the first phase reverse rotation value.

In some embodiments, the processor executes the instructions to enable the communication apparatus to: determine a plurality of second subcarrier data items on a plurality of second subcarriers of a second frequency subband based on the transmitted signal, where the first frequency subband does not overlap the second frequency subband in frequency domain; and perform second phase reverse rotation on the plurality of second subcarrier data items based on the mixing frequency and a second reference frequency corresponding to the second frequency subband, where the first reference frequency is different from the second reference frequency.

In some embodiments, the processor executes the instructions to enable the communication apparatus to: determine a second phase reverse rotation value based on a difference between the second reference frequency and the mixing frequency; and perform the second phase reverse rotation on each of the plurality of second subcarrier data items based on the second phase reverse rotation value.

According to a seventh aspect of the present disclosure, a computer-readable storage medium is provided. The computer-readable storage medium stores computer-executable instructions. When the computer-executable instructions are executed by a processor, an operation of the method according to any one of the first aspect or embodiments of the first aspect is implemented, or an operation of the method according to any one of the second aspect or embodiments of the second aspect is implemented.

According to an eighth aspect of the present disclosure, a chip or a chip system is provided. The chip or the chip system includes a processing circuit, and is configured to perform an operation of the method according to any one of the first aspect or embodiments of the first aspect, or perform an operation of the method according to any one of the second aspect or embodiments of the second aspect.

According to a ninth aspect of the present disclosure, a computer program or a computer program product is provided. The computer program or the computer program product is tangibly stored in a computer-readable medium and includes computer-executable instructions. When the computer-executable instructions are executed, an operation of the method according to any one of the first aspect or embodiments of the first aspect is implemented, or an operation of the method according to any one of the second aspect or embodiments of the second aspect is implemented.

It should be understood that content described in the summary of the invention is not intended to limit the key or important features of embodiments of the present disclosure, nor to limit the scope of the present disclosure. Other features of the present disclosure may be readily understood from the following description.

BRIEF DESCRIPTION OF DRAWINGS

The foregoing and other features, advantages, and aspects of embodiments of the present disclosure become more apparent in conjunction with the accompanying drawings and with reference to the following detailed description. In the accompanying drawings, the same or similar reference numerals indicate the same or similar elements.

DESCRIPTION OF EMBODIMENTS

Figure 1:
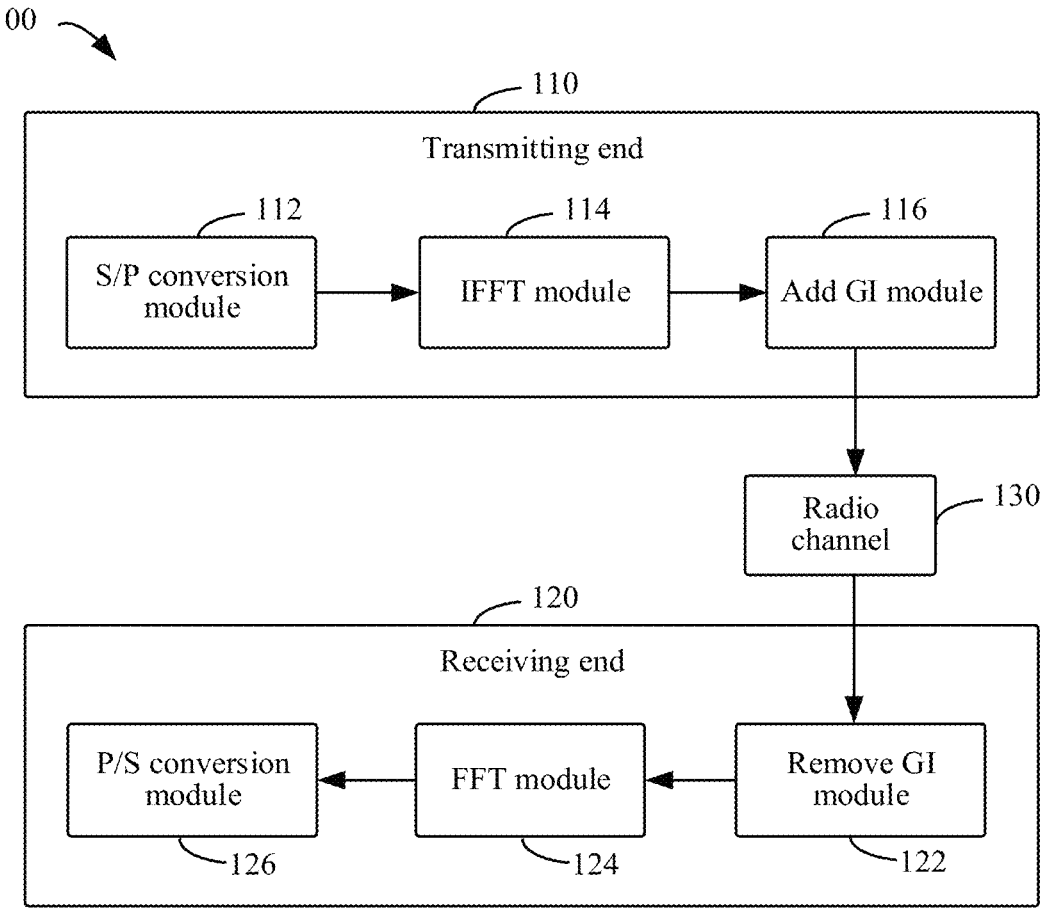
FIG. 1 is a schematic diagram of an OFDM system.

Embodiments of the present disclosure are described in more detail in the following with reference to the accompanying drawings. Although some embodiments of the present disclosure are shown in the accompanying drawings, it should be understood that the present disclosure may be implemented in various forms, and should not be construed as being limited to embodiments described herein. On the contrary, these embodiments are provided so that the present disclosure will be thoroughly and completely understood. It should be understood that the accompanying drawings and embodiments of the present disclosure are merely used as examples, but are not intended to limit the protection scope of the present disclosure.

In descriptions of embodiments of the present disclosure, the term "include" and similar terms thereof should be understood as open inclusion, that is, "include but are not limited to". The term "based" should be understood as "at least partially based". The terms "one embodiment" or "the embodiment" should be understood as "at least one embodiment". The terms "first", "second", and the like may indicate different or same objects. The term "and/or" represents at least one of two items associated with the term. For example, "A and/or B" indicates A or B, or A and B. Other explicit and implicit definitions may also be included below.

Embodiments of the present disclosure may be implemented according to any appropriate communication protocol, including but not limited to a cellular communication protocol such as $3^{rd}$ Generation (3G), $4^{th}$ Generation (4G), and $5^{th}$ Generation (5G), a wireless local area network communication protocol such as the Institute of Electrical and Electronics Engineers (IEEE) 802.11, and/or any other protocol currently known or developed in the future.

Technical solutions of embodiments of the present disclosure are applied to a communication system that complies with any proper communication protocol, for example, a general packet radio service (GPRS), a global system for mobile communications (GSM), an enhanced data rate for GSM evolution (EDGE) system, a universal mobile telecommunications system (UMTS), a long term evolution (LTE) system, a wideband code division multiple access (WCDMA) system, a code division multiple access 2000 (CDMA 2000) system, a time division-synchronization code division multiple access (TD-SCDMA) system, a frequency division duplex (FDD) system, time division duplex (TDD), a 5G system, and new radio (NR).

Embodiments of the present disclosure relate to a communication device. In an example communication system, the communication device may be a network device or a terminal device. In an example communication system, the communication device may be an access point (AP) device or a station (STA) device.

The term "terminal device" used in the present disclosure refers to any terminal device that can perform wired or wireless communication with a network device or with another terminal device. The terminal device may be sometimes referred to as user equipment (UE). The terminal device may be any type of mobile terminal, fixed terminal, or portable terminal. For example, the terminal device may include a mobile phone, a station, a unit, a device, a mobile terminal (MT), a subscription station, a portable subscription station, an Internet node, a communicator, a desktop computer, a laptop computer, a notebook computer, a tablet computer, a personal communication system device, a personal navigation device, a personal digital assistant (PDA), a positioning device, a radio broadcast receiver, an e-book device, a game device, an Internet of Things (IoT) device, a vehicle-mounted device, an aircraft, a virtual reality (VR) device, an augmented reality (AR) device, a wearable device, a terminal device in a 5G network, any terminal device in an evolved public land mobile network (PLMN), another device that can be configured for communication, or any combination thereof. This is not limited in embodiments of the present disclosure.

The term "network device" used in the present disclosure is an entity or a node that may be configured to communicate with a terminal device, for example, may be an access network device. The access network device may be an apparatus that is deployed in a radio access network and that provides a wireless communication function for a mobile terminal, for example, may be a radio access network (RAN)

network device. The access network device may include various types of base stations. For example, the access network device may include various forms of macro base stations, micro base stations, pico base stations, femto base stations, relay stations, access points, remote radio units (Remote Radio Units, RRUs), radio heads (RHs), remote radio heads (RRHs), and the like. In systems using different radio access technologies, names of access network devices may be different. For example, an access network device is referred to as an evolved NodeB (eNB or eNodeB) in a long term evolution (LTE) network, is referred to as a NodeB (NB) in a 3G network, and may be referred to as a g NodeB (gNB) or an NR NodeB (NR NB) in a 5G network. In some scenarios, the access network device may include a central unit (CU) and/or a distributed unit (DU). The CU and DU can be placed in different places. For example, the DU is placed remotely in a high-traffic area, and the CU is placed in the central equipment room. Alternatively, the CU and the DU may be placed in a same equipment room. The CU and the DU may also be different components in one rack. For ease of description, in subsequent embodiments of the present disclosure, the foregoing apparatuses that provide a wireless communication function for a mobile terminal are collectively referred to as network devices. This is not specifically limited in embodiments of the present disclosure.

The term "access point" used in the present disclosure may also be referred to as a station of an access point type. The AP is an apparatus having a wireless transceiver function, and may provide a service for a station. The AP may also be referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge connecting a wired network and a wireless network. Main functions of the AP are to connect STAs together and then connect a wireless network to a wired network. Optionally, the AP may be a terminal device or a network device with a wireless fidelity (Wireless Fidelity, Wi-Fi) chip. For example, the AP may be a communication server, a router, a switch, or a bridge. Optionally, the AP may be a device that supports the 802.11 standard in a current network system or a future network system.

The term "station" used in the present disclosure may be an apparatus having a wireless transceiver function, and may access a wireless local area network based on an access point. The STA may be a wireless communication chip, a wireless sensor, or a wireless communication terminal. For example, the STA may also be referred to as a system, a subscriber unit, an access terminal, a mobile station, a remote station, a remote terminal, a mobile device, a user terminal, a terminal, a wireless communication device, a user agent, a user apparatus, or user equipment (UE). The STA may be a wireless communication chip, a wireless sensor, or a wireless communication terminal. For example, the STA is a mobile phone that supports a Wi-Fi communication function, a tablet computer that supports a Wi-Fi communication function, a set-top box that supports a Wi-Fi communication function, a smart television set that supports a Wi-Fi communication function, a smart wearable device that supports a Wi-Fi communication function, a vehicle-mounted communication device that supports a Wi-Fi communication function, a computer that supports a Wi-Fi communication function, or the like. Optionally, the STA may be a device that supports the 802.11 standard in a current network system or a future network system.

The term "OFDM" used in the present disclosure is a technology for implementing multi-carrier communication by using mutually orthogonal subcarriers. FIG. 1 is a schematic diagram of an OFDM system 100. The system 100 includes a transmitting end 110 and a receiving end 120. A signal and the like sent by the transmitting end 110 may reach the receiving end 120 through a radio channel 130.

As shown in FIG. 1, the transmitting end 110 may include a serial-parallel (S/P) conversion module 112, an inverse fast Fourier transform (IFFT) module 114, and an add guard interval (ADD GI) module 116. The receiving end 120 includes a remove guard interval module 122, a fast Fourier transform (FFT) module 124, and a parallel-serial conversion module 126.

At the transmitting end 110, a high-speed data stream becomes a plurality of low-rate bitstreams after passing through the S/P conversion module 112. Each bitstream may be sent by using one subcarrier. A parallel transmission technology greatly increases a transmission periodicity of each code element. Therefore, inter symbol interference (ISI) caused by a multipath delay can be reduced, and system self-interference is reduced. Then, a multi-carrier mapping and superposition process may be implemented by using the IFFT module 114, and a large quantity of narrowband subcarrier frequency domain signals are transformed into time domain signals. In an example, the IFFT module 114 may perform inverse discrete Fourier transform. Before an OFDM symbol is sent, the add GI module 116 adds a guard interval between code elements, so that an impact caused by a multipath delay can be prevented from affecting a next symbol periodicity. Therefore, inter symbol interference and inter carrier interference are eliminated. Specifically, the guard interval used by the add GI module 116 is a cyclic prefix (CP). To be specific, a tail part of each OFDM symbol is copied to the front of the symbol. In this way, in comparison with purely adding an idle guard interval, redundant symbol information is added. This is more conductive to overcoming interference. Further, after the CP is added, the transmitting end 110 further performs analog up-conversion based on an analog frequency mixer by using a mixing frequency $f_{mixer}$, to obtain an up-converted signal.

At the receiving end 120, after the signal is received, the data stream is recovered by using a series of reverse operations. Specifically, the receiving end 120 performs analog down-conversion by using a mixing frequency $f_{mixer}$ the same as that used by the transmitting end 110, to obtain a down-converted signal, removes GI (for example, the CP) by using the remove guard interval module 122, performs time domain to frequency domain transformation by using the FFT module 124, and recovers the data stream by using the parallel-serial conversion module 126.

As described above with reference to FIG. 1, the mixing frequency used by the transmitting end 110 to perform a frequency mixing operation is the same as that used by the receiving end 120. To be specific, before signal transmission, mixing frequency alignment needs to be performed between the transmitting end 110 and the receiving end 120 through signaling or the like. This increases signaling overheads, reduces signal transmission efficiency, and increases system complexity.

In view of this, embodiments of the present disclosure provide an information transmission solution, in which there is no need to perform mixing frequency alignment between a transmitting end and a receiving end in advance. Therefore, signaling overheads are reduced, and transmission efficiency is ensured.

Figure 2:
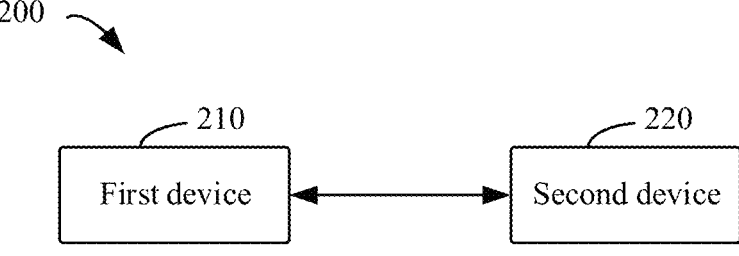
FIG. 2 is a schematic diagram of an example environment in which embodiments of the present disclosure may be implemented.

FIG. 2 is a schematic diagram of an example environment 200 in which embodiments of the present disclosure may be implemented. FIG. 2 shows a first device 210 and a second device 220. The first device 210 and the second device 220 can communicate with each other.

Device types of the first device 210 and the second device 220 are not limited in embodiments of the present disclosure, for example, may be network devices, terminal devices, access point devices, station devices, or the like, or may be relay devices, core network devices, or any other device types. This is not listed in this specification. In addition, it may be understood that the first device 210 and the second device 220 may be of a same device type or may be of different device types.

For ease of description, the following assumes that the first device 210 is a transmitting end device, and the second device 220 is a receiving end device. In other words, it is assumed that the first device 210 sends information to the second device 220.

Figure 3:
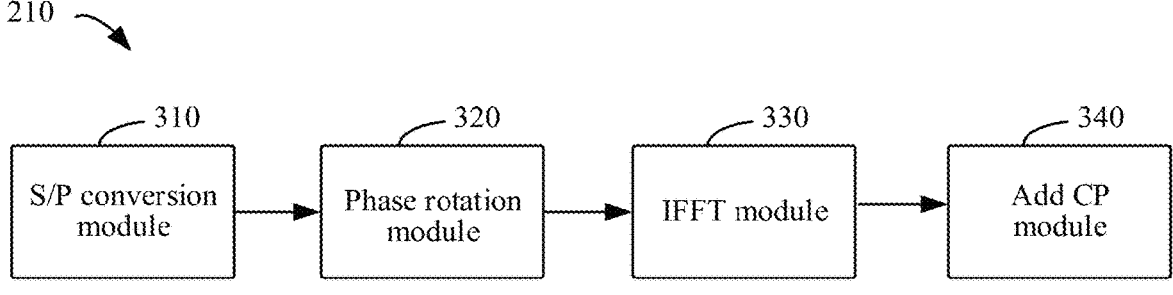
FIG. 3 is a block diagram of modules in which a first device serves as a transmitting end device according to some embodiments of the present disclosure.

FIG. 3 is a block diagram of modules in which a first device 210 serves as a transmitting end device according to some embodiments of the present disclosure. As shown in FIG. 3, the first device 210 includes a serial-parallel conversion module 310, a phase rotation module 320, an IFFT module 330, and an add CP module 340.

Figure 4:
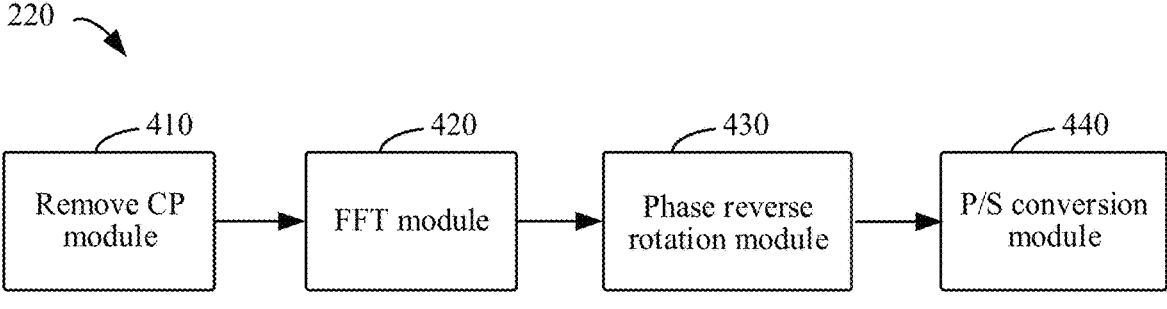
FIG. 4 is a block diagram of modules in which a second device serves as a receiving end device according to some embodiments of the present disclosure.

FIG. 4 is a block diagram of modules in which a second device 220 serves as a receiving end device according to some embodiments of the present disclosure. As shown in FIG. 4, the second device 220 includes a remove CP module 410, an FFT module 420, a phase reverse rotation module 430, and a parallel-serial conversion module 440.

It should be understood that, in another embodiment, the first device 210 may also serve as a receiving end device, and the second device 220 may serve as a transmitting end device. In this case, the first device 210 may include the modules of the receiving end device shown in FIG. 4, and the second device 220 may include the modules at the transmitting end shown in FIG. 3.

Figure 5:
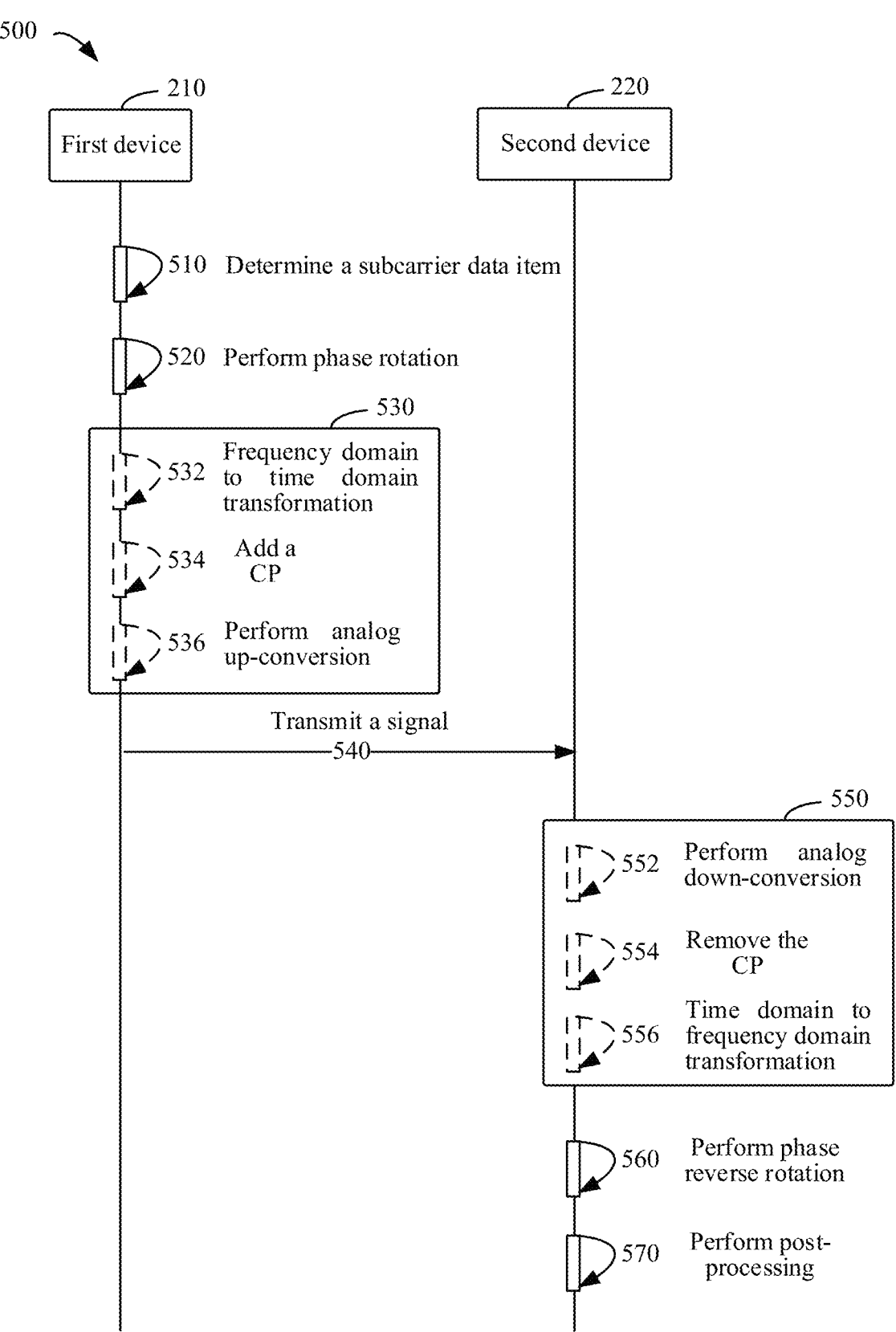
FIG. 5 is a schematic diagram of signaling exchange of an information transmission process according to some embodiments of the present disclosure.
Figure 6:
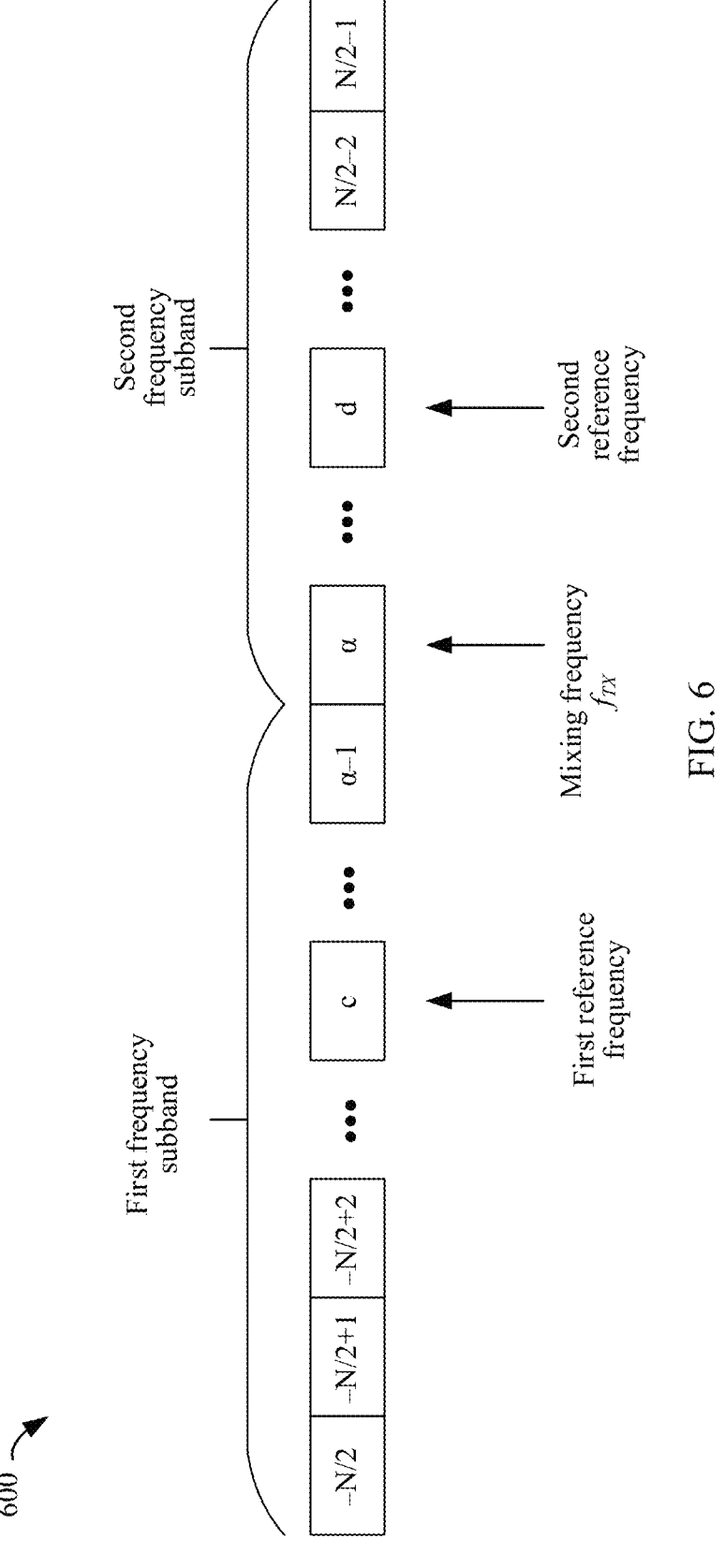
FIG. 6 is a schematic diagram in which OFDM symbols processed by a first device are distributed on a plurality of subcarriers according to some embodiments of the present disclosure.
Figure 7:
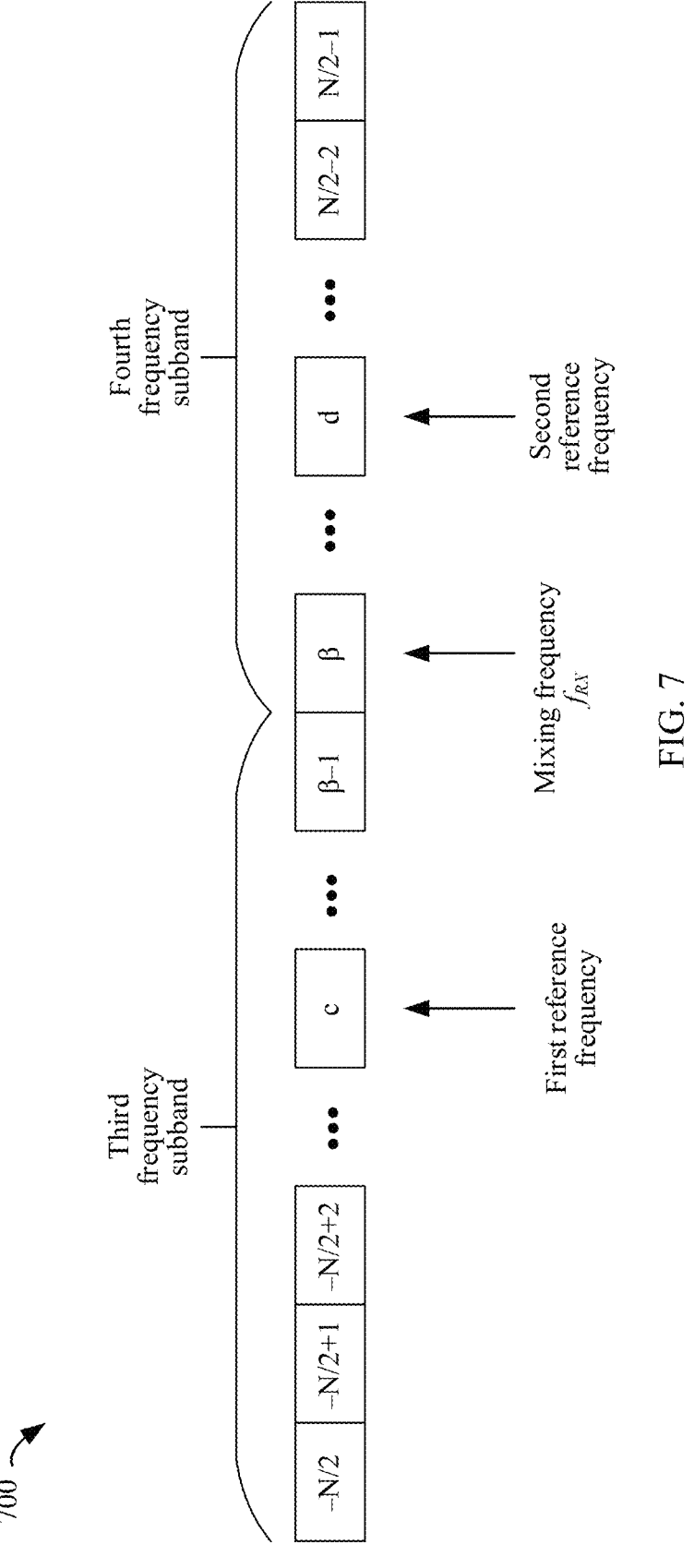
FIG. 7 is a schematic diagram in which OFDM symbols processed by a second device are distributed on a plurality of subcarriers according to some embodiments of the present disclosure.

The following describes some embodiments of information transmission in the present disclosure based on FIG. 2 to FIG. 4 with reference to FIG. 5 to FIG. 7.

FIG. 5 is a schematic diagram of signaling exchange of an information transmission process 500 according to some embodiments of the present disclosure. The process 500 relates to the first device 210 and the second device 220.

In the process 500, the first device 210 determines a plurality of first subcarrier data items on a plurality of first subcarriers of a first frequency subband (510).

In some embodiments, the first frequency subband may be equal to transmission bandwidth. In some embodiments, the first frequency subband may be a part of transmission bandwidth. Specifically, the transmission bandwidth may be divided into several frequency subbands. In this way, several corresponding subband signals may be sent in an OFDM symbol. For example, two subbands may be included: a first frequency subband and a second frequency subband. Frequency ranges of the first frequency subband and the second frequency subband may be equal or may not be equal. In addition, it may be understood that a quantity of frequency subbands is not limited in embodiments of the present disclosure. Although for ease of description, two subbands are used as an example for description, in an actual scenario, more subbands may be included. For ease of description, the following embodiments of the present disclosure are described by using the example in which "the first frequency subband and the second frequency subband are included". Embodiments that include only one frequency subband or include more frequency subbands may be obtained similarly. For brevity, details are not described herein.

Additionally or optionally, the first device 210 may further determine a plurality of second subcarrier data items on a plurality of second subcarriers of a second frequency subband.

With reference to FIG. 3, the serial-parallel conversion module 310 may convert a high-speed data stream into a plurality of low-rate bitstreams, to send the plurality of low-rate data streams on a plurality of available subcarriers. To simplify description, it may be assumed that a quantity of the plurality of subcarriers is N, and N is an even number. Correspondingly, the N subcarriers may be numbered, for example, from $-N/2$ to $N/2-1$. It may be understood that the quantity and the numbering manner are merely examples. Alternatively, another quantity (for example, an odd number) and another numbering manner may be included. Details are not described herein again.

For example, the plurality of low-rate bitstreams may also be referred to as a plurality of subcarrier data items, for example, N subcarrier data items. The subcarrier data items may be represented as $X(k)$, where $-N/2 \leq k < N/2$. Specifically, the plurality of first subcarrier data items may be represented as $X(k)$, where $-N/2 \leq k < \alpha$. The plurality of second subcarrier data items are represented as $X(k)$, where $\alpha \leq k < N/2$.

To be specific, subcarrier numbers corresponding to the first frequency subband are $-N/2$ to $\alpha$, and subcarrier numbers corresponding to the second frequency subband are $\alpha$ to $N/2$. The subcarrier number $\alpha$ that separates the first frequency subband from the second frequency subband may be determined by the first device 210 based on a mixing frequency (namely, a transmitting end mixing frequency) used by the first device 210. The mixing frequency (namely, the transmitting end mixing frequency) used by the first device 210 may be represented as $f_{TX}$, and may be set by the first device 210. In addition, the transmitting end mixing frequency may be unknown to a receiving end device (the second device 220). In this way, there is no need to perform mixing frequency alignment between the first device 210 and the second device 220 in advance. Therefore, signaling overheads are reduced.

It may be understood that the transmitting end mixing frequency $f_{TX}$ is unknown to the receiving end device (namely, the second device 220), and a corresponds to the transmitting end mixing frequency $f_{TX}$. Therefore, it may be understood that a is also unknown to the receiving end device (namely, the second device 220). In other words, the second device 220 does not know a carrier subband division manner of the first device 210.

The first device 210 performs first phase rotation on each of the plurality of first subcarrier data items based on a first mixing frequency and a first reference frequency corresponding to the first frequency subband (520).

Similarly, the first device 210 performs second phase rotation on each of the plurality of second subcarrier data items based on the first mixing frequency and a second reference frequency corresponding to the second frequency subband.

In embodiments of the present disclosure, there is a correspondence between a frequency subband and a reference frequency. The correspondence may be specified in a protocol or may be preconfigured. In this way, additional signaling overheads between the first device 210 and the second device 220 can be avoided. Therefore, transmission efficiency can be improved. In embodiments of the present disclosure, different frequency subbands do not overlap in frequency domain, and reference frequencies corresponding to the different frequency subbands are also different. Specifically, the first frequency subband does not overlap the second frequency subband in frequency domain, and the first reference frequency is different from the second reference frequency.

In an example, it may be assumed that the first reference frequency is lower than the second reference frequency. It should be understood that a frequency interval between the first reference frequency and the second reference frequency is not fixed, and depends on a channel number. For example, a quantity of subcarriers between the first reference frequency and the second reference frequency may be 41, 42, or another value. This is not limited in the present disclosure.

As described above, the first mixing frequency is determined by the first device 210. However, a manner of determining the transmitting end mixing frequency used by the first device 210 is not limited in embodiments of the present disclosure. For example, the first device 210 may use any frequency between the first reference frequency and the second reference frequency as the transmitting end mixing frequency (namely, the first mixing frequency).

It may be understood that a specific manner of setting the correspondence is not limited in embodiments of the present disclosure. For example, the first reference frequency may correspond to a frequency subband having a low frequency, and the second reference frequency may correspond to a frequency subband having a high frequency. In this way, regardless of a value of a, the first reference frequency corresponds to the first frequency subband including the subcarrier number $-N/2$, and the second reference frequency corresponds to the second frequency subband including the subcarrier number $N/2-1$. The first reference frequency may be represented as $f_{REF1}$, and the second reference frequency may be represented as $f_{REF2}$.

The first mixing frequency is the mixing frequency used by the first device 210, and may also be referred to as the transmitting end mixing frequency, and is represented as $f_{TX}$.

FIG. 6 is a schematic diagram of an example of distribution 600 of OFDM symbols processed by a first device 210 on a plurality of subcarriers. In FIG. 6, a number range of the plurality of subcarriers is from $-N/2$ to $N/2-1$. A subcarrier number range from $-N/2$ to $\alpha-1$ corresponds to the first frequency subband, a subcarrier number range from $\alpha$ to $N/2-1$ corresponds to the second frequency subband, a subcarrier number corresponding to the first mixing frequency is $\alpha$, a subcarrier number corresponding to the first reference frequency is c, and a subcarrier number corresponding to the second reference frequency is d.

With reference to FIG. 3, the phase rotation module 320 may perform phase rotation on a subcarrier data item. Specifically, a first phase rotation value may be determined based on a difference between the first mixing frequency $f_{TX}$ and the first reference frequency $f_{REF1}$, and first phase rotation is performed on each first subcarrier data item based on the first phase rotation value. Similarly, a second phase rotation value may be determined based on a difference between the first mixing frequency $f_{TX}$ and the second reference frequency $f_{REF2}$, and second phase rotation is performed on each second subcarrier data item based on the second phase rotation value.

A plurality of subcarrier data items obtained through phase rotation may be represented as $X_{rotated}(k)$. For example, a plurality of first subcarrier data items obtained through first phase rotation and a plurality of second sub-carrier data items obtained through second phase rotation may be represented by Formula 1 and Formula 2 respectively:

$$X_{rotated}(k) = X(k) * \exp(j * 2 * pi * (f_{TX} - f_{REF1}) * T * s), -N/2 \leq k < a \quad \text{(Formula 1)}$$

$$X_{rotated}(k) = X(k) * \exp(j * 2 * pi * (f_{TX} - f_{REF2}) * T * s), a \leq k < N/2 \quad \text{(Formula 2)}$$

In Formula 1 and Formula 2, X(k) represents the subcarrier data item, $f_{TX}$ is the first mixing frequency (namely, a transmitting end mixing frequency), $f_{REF1}$ is the first reference frequency, $f_{REF2}$ is the second reference frequency, T is time domain duration of the OFDM symbol, s is a number (where s=0, 1, 2, . . . ) of the OFDM symbol, T=(N+G)/N/F, G is a quantity of sample points of a guard interval, and F is a subcarrier interval.

In the process 500, the first device 210 determines a to-be-transmitted signal based on the plurality of first subcarrier data items obtained through first phase rotation (530).

Specifically, the first device 210 may determine the transmitted signal based on the plurality of first subcarrier data items obtained through first phase rotation and the plurality of second subcarrier data items obtained through second phase rotation.

In some embodiments, that the first device 210 determines a to-be-transmitted signal may include at least one of frequency domain to time domain transformation, CP addition, and analog up-conversion.

Additionally or optionally, the first device 210 may perform frequency domain to time domain transformation on the plurality of subcarrier data items obtained through phase rotation (532).

With reference to FIG. 3, the IFFT module 330 may transform the plurality of subcarrier data items obtained through phase rotation into time domain signals. A quantity of sample points on which IFFT is performed is N. Inverse discrete Fourier transform is used as an example, and the following may be obtained:

$$x(n) = (1/N) \sum_{k=-N/2 \text{ to } N/2-1} X_{rotated}(k) * \exp(j * 2 * pi * k * n/N), 0 \leq n < N \quad \text{(Formula 3)}$$

In Formula 3, x(n) represents an output result of an $n^{th}$ sample point of the inverse discrete Fourier transform.

Additionally or optionally, the first device 210 may further add a guard interval to eliminate inter symbol interference and inter carrier interference (534).

With reference to FIG. 3, the add CP module 340 may copy a tail part of each OFDM symbol to the front of the symbol, to add a CP. It is assumed that a quantity of sample points of the guard interval is G. In this case, after processing by the add CP module 340, a length of the symbol changes to N+G. For example, a symbol to which the guard interval is added may be represented as $x_{GI}(n)$.

Additionally or optionally, the first device 210 may further perform analog up-conversion (536). Specifically, an up-converted signal may be obtained by using the following formula:

$$x_{mixer}(n) = x_{GI}(n) * \exp(j * 2 * \pi * n * f_{TX} * T), 0 \leq n < n_{total} \quad \text{(Formula 4)}$$

In Formula 4, $x_{mixer}(n)$ represents the signal obtained through analog up-conversion, $n_{total}$ represents a total quantity of sample points, and $f_{TX}$ represents the mixing frequency (namely, the transmitting end mixing frequency) used by the first device 210, and has a same value as that in Formula 1 and Formula 2.

In some embodiments, the up-converted signal may be used as the to-be-transmitted signal, and then the first device 210 sends the to-be-transmitted signal (540).

Specifically, the first device 210 sends the to-be-transmitted signal to the second device 220, so that the second device 220 can receive the transmitted signal.

The second device 220 determines a plurality of third subcarrier data items on a plurality of third subcarriers of a third frequency subband based on the transmitted signal (550).

With reference to the foregoing descriptions, specifically, the second device 220 may further determine a plurality of fourth subcarrier data items on a plurality of fourth subcarriers of a fourth frequency subband.

In some embodiments, that the second device 220 determines a plurality of subcarrier data items may include at least one of analog down-conversion, CP removal, and time domain to frequency domain transformation.

Additionally or optionally, the second device 220 may further perform analog down-conversion (552). Specifically, a down-converted signal may be obtained by using the following formula:

$$x'_{GI}(n) = x_{mixer}(n) * \exp(-j * 2 * pi * n * f_{RX} * T), 0 \leq n < n_{total} \quad \text{(Formula 5)}$$

In Formula 5, $x_{mixer}(n)$ represents the transmitted signal, for example, may be the signal obtained through analog up-conversion by the first device 210, $n_{total}$ represents the total quantity of sample points, $f_{RX}$ represents a mixing frequency (namely, a receiving end mixing frequency) used by the second device 220, and $x'_{GI}(n)$ represents the signal obtained through analog down-conversion.

In embodiments of the present disclosure, the mixing frequency (namely, the receiving end mixing frequency) used by the second device 220 may be set by the second device 220, and a manner of setting the mixing frequency is not limited in the present disclosure. In addition, the receiving end mixing frequency may be unknown to the transmitting end device (the first device 210). In this way, there is no need to perform mixing frequency alignment between the first device 210 and the second device 220 in advance. Therefore, signaling overheads are reduced.

Additionally or optionally, the second device 220 may further remove the guard interval (554).

With reference to FIG. 4, the remove CP module 410 may remove the part copied to the front of each OFDM symbol, to remove the CP. It is assumed that a quantity of sample points used before CP removal is N+G. In this case, after processing by the remove CP module 410, a length of the symbol changes to N. For example, a symbol from which the guard interval is removed may be represented as x'(n).

Additionally or optionally, the second device 220 may further perform time domain to frequency domain transformation (556).

With reference to FIG. 4, the FFT module 420 may transform the time domain symbol from which the guard interval is removed into a frequency domain signal. A quantity of sample points on which FFT is performed is N. Discrete Fourier transform is used as an example, and the following may be obtained:

$$X'(k) = \sum_{n=0\ to\ N-1} x'(n) * \exp(-j * 2 * pi * k * n/N), \quad \text{(Formula 6)}$$

$$-N/2 \le k < N/2$$

In Formula 6, x'(n) represents N sample points and is an input of the discrete Fourier transform, and X'(k) is an output result of the discrete Fourier transform.

In this way, N subcarrier data items X'(k) may be obtained, and may include the plurality of third subcarrier data items X'(k) on the plurality of third subcarriers of the third frequency subband, where $-N/2 \le k < \beta$, and the plurality of fourth subcarrier data items X'(k) on the plurality of fourth subcarriers of the fourth frequency subband, where $\beta \le k < N/2$.

In embodiments with reference to FIG. 5, in processes of receiving and demodulating signals, the second device 220 may divide the bandwidth into two subbands: the third frequency subband and the fourth frequency subband. However, it may be understood that a quantity of frequency subbands is not limited in embodiments of the present disclosure. Although for ease of description, two subbands are used as an example for description, in an actual scenario, more subbands may be included.

Subcarrier numbers corresponding to the third frequency subband are $-N/2$ to $\beta$, and subcarrier numbers corresponding to the fourth frequency subband are $\beta$ to N/2. The subcarrier number $\beta$ that separates the third frequency subband from the fourth frequency subband may be determined by the second device 220 based on the mixing frequency (namely, the receiving end mixing frequency) used by the second device 220. The mixing frequency (namely, the receiving end mixing frequency) used by the second device 220 may be represented as $f_{RX}$, and may be set by the second device 220. In addition, the receiving end mixing frequency may be unknown to the transmitting end device (the first device 210). In this way, there is no need to perform mixing frequency alignment between the first device 210 and the second device 220 in advance. Therefore, signaling overheads are reduced.

It may be understood that the receiving end mixing frequency $f_{RX}$ is unknown to the transmitting end device (namely, the first device 210), and $\beta$ corresponds to the receiving end mixing frequency $f_{RX}$. Therefore, it may be understood that $\beta$ is also unknown to the transmitting end device (namely, the first device 210). In other words, the second device 220 does not know a carrier subband division manner of the first device 210.

In the process 500, the second device 210 performs first phase reverse rotation on the plurality of third subcarrier data items based on a second mixing frequency and a first reference frequency corresponding to the third frequency subband (560).

Similarly, the second device 220 performs second phase reverse rotation on the plurality of fourth subcarrier data items based on the second mixing frequency and a second reference frequency corresponding to the fourth frequency subband.

In embodiments of the present disclosure, there is a correspondence between a frequency subband and a reference frequency. The correspondence may be specified in a protocol or may be preconfigured. In this way, additional signaling overheads between the first device 210 and the second device 220 can be avoided. Therefore, transmission efficiency can be improved. In embodiments of the present disclosure, different frequency subbands do not overlap in frequency domain, and reference frequencies corresponding to the different frequency subbands are also different. Specifically, the third frequency subband does not overlap the fourth frequency subband in frequency domain, and the first reference frequency is different from the second reference frequency. It may be understood that a specific manner of setting the correspondence is not limited in embodiments of the present disclosure. For example, the first reference frequency may correspond to a frequency subband having a low frequency, and the second reference frequency may correspond to a frequency subband having a high frequency. In this way, regardless of a value of $\beta$, the first reference frequency corresponds to the third frequency subband including the subcarrier number $-N/2$, and the second reference frequency corresponds to the fourth frequency subband including the subcarrier number $N/2-1$. As described above, the first reference frequency may be represented as $f_{REF1}$, and the second reference frequency may be represented as $f_{REF2}$.

Therefore, the first reference frequency and the second reference frequency may be specified in the protocol or may be preconfigured. The first reference frequency corresponds to the frequency subband having a low frequency, and the second reference frequency corresponds to the frequency subband having a high frequency. In this way, when two frequency subbands are obtained through division in frequency domain, both the first device 210 and the second device 220 can directly use the first reference frequency and the second reference frequency without additional signaling exchange. This can reduce the signaling overheads.

The second mixing frequency is the mixing frequency used by the second device 220, and may also be referred to as the receiving end mixing frequency, and is represented as $f_{RX}$. As described above, the second mixing frequency is determined by the second device 220. However, a manner of determining the receiving end mixing frequency used by the second device 220 is not limited in embodiments of the present disclosure. For example, the second device 220 may use any frequency between the first reference frequency and the second reference frequency as the receiving end mixing frequency (namely, the second mixing frequency). In addition, it may be understood that an operation of determining the first mixing frequency by the first device 210 and an operation of determining the second mixing frequency by the second device 220 are independent of each other. Therefore, the first mixing frequency $f_{TX}$ and the second mixing frequency $f_{RX}$ are independent of each other, and there is no mutual dependency relationship.

FIG. 7 is a schematic diagram 700 in which OFDM symbols processed by the second device 220 are distributed on a plurality of subcarriers. In FIG. 7, a number range of the plurality of subcarriers is from $-N/2$ to $N/2-1$. A subcarrier number range from $-N/2$ to $\beta-1$ corresponds to the third frequency subband, a subcarrier number range from $\beta$ to $N/2-1$ corresponds to the fourth frequency subband, a subcarrier number corresponding to the second mixing frequency is $\beta$, a subcarrier number corresponding to the first reference frequency is c, and a subcarrier number corresponding to the second reference frequency is d.

With reference to FIG. 4, the phase reverse rotation module 430 may perform phase reverse rotation on a subcarrier data item. In an embodiment, a first phase reverse rotation value may be determined based on a difference between the first reference frequency $f_{REF1}$ and the second mixing frequency $f_{RX}$, and first phase reverse rotation is performed on each third subcarrier data item based on the first phase reverse rotation value. Similarly, a second phase reverse rotation value may be determined based on a difference between the second reference frequency $f_{REF2}$ and the second mixing frequency $f_{RX}$, and second phase reverse rotation is performed on each fourth subcarrier data item based on the second phase reverse rotation value.

A plurality of subcarrier data items obtained through phase reverse rotation may be represented as $X_{derotated}(k)$. For example, a plurality of third subcarrier data items obtained through first phase reverse rotation and a plurality of fourth subcarrier data items obtained through second phase reverse rotation may be represented by the following Formula 7 and Formula 8 respectively:

$$X_{derotated}(k) = X'(k) * \exp(j * 2 * pi * (f_{REF1} - f_{RX}) * T * s), \quad \text{(Formula 7)}$$

$$-N/2 \leq k < \beta$$

$$X_{derotated}(k) = X'(k) * \exp(j * 2 * pi * (f_{REF2} - f_{RX}) * T * s), \quad \text{(Formula 8)}$$

$$\beta \leq k < N/2$$

In Formula 7 and Formula 8, $X'(k)$ represents the subcarrier data item (for example, a third subcarrier data item or a fourth subcarrier data item), $f_{RX}$ is the second mixing frequency (namely, the receiving end mixing frequency), $f_{REF1}$ is the first reference frequency, $f_{REF2}$ is the second reference frequency, T is time domain duration of the OFDM symbol, s is a number (where s=0, 1, 2, . . . ) of the OFDM symbol, T=(N+G)/N/F, G is a quantity of sample points of a guard interval, and F is a subcarrier interval.

In the process 500, the second device 210 performs post-processing on the plurality of third subcarrier data items obtained through first phase reverse rotation (570).

In an embodiment, the second device 210 may perform post-processing on the plurality of third subcarrier data items obtained through first phase reverse rotation and the plurality of fourth subcarrier data items obtained through second phase reverse rotation.

With reference to FIG. 4, parallel-to-serial conversion may be performed by the parallel-serial conversion module 440, to combine a plurality of streams into a single data stream.

In this way, according to embodiments of the present disclosure, the first reference frequency and the second reference frequency may be predetermined or preconfigured, so that there is no need to perform mixing frequency alignment between the transmitting end device and the receiving end device. Therefore, signaling overheads can be reduced, and processing efficiency can be improved. Further, in embodiments of the present disclosure, the transmitting end performs phase rotation, and the receiving end performs phase reverse rotation to compensate for phase deviation. In this manner, a difference caused by mixing frequency misalignment between the transmitting end and the receiving end can be eliminated. Therefore, accuracy of information transmission can be ensured.

It should be understood that, in embodiments of the present disclosure, "first", "second", "third", and the like are only intended to indicate that a plurality of objects may be different, but two objects may be the same. The "first", "second", "third", and the like should not be construed as a limitation on embodiments of the present disclosure.

It should be further understood that the manners, cases, and categories in embodiments of the present disclosure and division into embodiments are only intended for ease of description, and should not constitute particular limitations. The manners, categories, cases, and the features in the embodiments may be combined with each other if logical.

It should be further understood that, the foregoing content is only intended to help a person skilled in the art better understand embodiments of the present disclosure, instead of limiting the scope of embodiments of the present disclosure. A person skilled in the art may make various modifications, changes, combinations, or the like according to the foregoing content. A modified, changed, or combined solution also falls within the scope of embodiments of the present disclosure.

It should be further understood that the descriptions of the foregoing content focus on emphasizing a difference between the embodiments, and for the same or similar content of the embodiments, reference may be made to each other. For simplicity, details are not described herein again.

Figure 8:
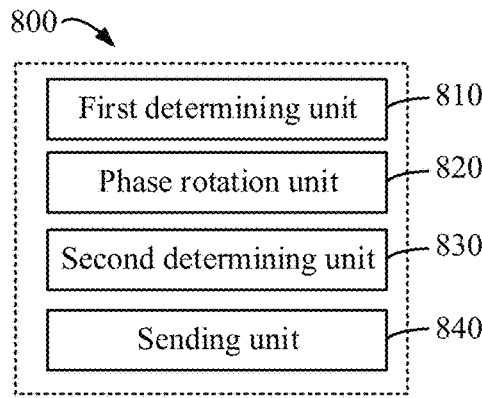
FIG. 8 is a schematic block diagram of a communication apparatus according to some embodiments of the present disclosure.

FIG. 8 is a schematic block diagram of a communication apparatus 800 according to some embodiments of the present disclosure. The apparatus 800 may be implemented as a first device 210, or may be implemented as a part (for example, a chip) of the first device 210, or the like. This is not limited in the present disclosure.

As shown in FIG. 8, the apparatus 800 may include a first determining unit 810, a phase rotation unit 820, a second determining unit 830, and a sending unit 840.

The first determining unit 810 is configured to determine a plurality of first subcarrier data items on a plurality of first subcarriers of a first frequency subband. The phase rotation unit 820 is configured to perform first phase rotation on each of the plurality of first subcarrier data items based on a mixing frequency and a first reference frequency corresponding to the first frequency subband. The second determining unit 830 is configured to determine a to-be-transmitted signal based on a plurality of first subcarrier data items obtained through first phase rotation. The sending unit 840 is configured to send the to-be-transmitted signal.

In an embodiment, the phase rotation unit 820 may be configured to: determine a first phase rotation value based on a difference between the mixing frequency and the first reference frequency; and perform the first phase rotation on each of the plurality of first subcarrier data items based on the first phase rotation value.

In some embodiments, the first determining unit 810 may be further configured to determine a plurality of second subcarrier data items on a plurality of second subcarriers of a second frequency subband, where the first frequency subband does not overlap the second frequency subband in frequency domain. The phase rotation unit 820 may be further configured to perform second phase rotation on each of the plurality of second subcarrier data items based on the mixing frequency and a second reference frequency corresponding to the second frequency subband, where the first reference frequency is different from the second reference frequency.

In an embodiment, the phase rotation unit 820 may be configured to: determine a second phase rotation value based on a difference between the mixing frequency and the second reference frequency; and perform the second phase rotation on each of the plurality of second subcarrier data items based on the second phase rotation value.

In some embodiments, the second determining unit 830 may be configured to determine the to-be-transmitted signal based on the plurality of first subcarrier data items obtained through first phase rotation and a plurality of second subcarrier data items obtained through second phase rotation.

It may be understood that module or unit division in embodiments of the present disclosure is an example, and is merely logical function division. In actual implementation, there may be another division manner. In addition, functional units in disclosed embodiments may be integrated into one unit or may exist alone physically, or two or more units may be integrated into one unit. The integrated unit may be implemented in a form of hardware, or may be implemented in a form of a software functional unit. With reference to FIG. 3, the first determining unit 810 may be implemented as the S/P conversion module 310, the phase rotation unit 820 may be implemented as the phase rotation module 320, and the second determining unit 830 may be implemented as the IFFT module 330 and the add CP module 340.

The apparatus 800 in FIG. 8 can be configured to implement the processes performed by the first device 210 in the foregoing embodiments. For brevity, details are not described herein again.

Figure 9:
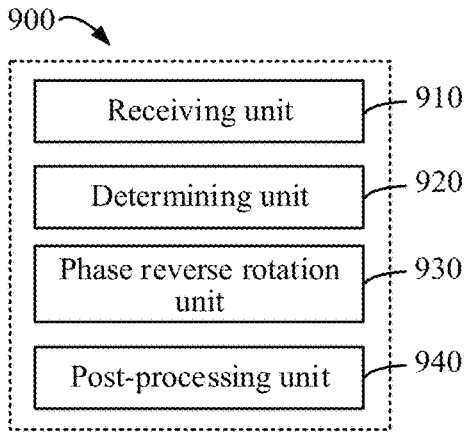
FIG. 9 is a schematic block diagram of another communication apparatus according to some embodiments of the present disclosure.

FIG. 9 is a schematic block diagram of a communication apparatus 900 according to some embodiments of the present disclosure. The apparatus 900 may be implemented as a second device 220, or may be implemented as a part (for example, a chip) of the second device 220, or the like. This is not limited in the present disclosure.

As shown in FIG. 9, the apparatus 900 may include a receiving unit 910, a determining unit 920, a phase reverse rotation unit 930, and a post-processing unit 940.

The receiving unit 910 is configured to receive a transmitted signal. The determining unit 920 is configured to determine a plurality of first subcarrier data items on a plurality of first subcarriers of a first frequency subband based on the transmitted signal. The phase reverse rotation unit 930 is configured to perform first phase reverse rotation on the plurality of first subcarrier data items based on a mixing frequency and a first reference frequency corresponding to the first frequency subband. The post-processing unit 940 is configured to perform post-processing on a plurality of first subcarrier data items obtained through first phase reverse rotation.

In an embodiment, the phase reverse rotation unit 930 may be configured to: determine a first phase reverse rotation value based on a difference between the first reference frequency and the mixing frequency; and perform the first phase reverse rotation on each of the plurality of first subcarrier data items based on the first phase reverse rotation value.

In some embodiments, the determining unit 910 may be further configured to determine a plurality of second subcarrier data items on a plurality of second subcarriers of a second frequency subband based on the transmitted signal, where the first frequency subband does not overlap the second frequency subband in frequency domain. The phase reverse rotation unit 930 may be further configured to perform second phase reverse rotation on the plurality of second subcarrier data items based on the mixing frequency and a second reference frequency corresponding to the second frequency subband, where the first reference frequency is different from the second reference frequency.

In an embodiment, the phase reverse rotation unit 930 may be configured to: determine a second phase reverse rotation value based on a difference between the second reference frequency and the mixing frequency; and perform the second phase reverse rotation on each of the plurality of second subcarrier data items based on the second phase reverse rotation value.

It may be understood that module or unit division in embodiments of the present disclosure is an example, and is merely logical function division. In actual implementation, there may be another division manner. In addition, functional units in disclosed embodiments may be integrated into one unit or may exist alone physically, or two or more units may be integrated into one unit. The integrated unit may be implemented in a form of hardware, or may be implemented in a form of a software functional unit. With reference to FIG. 4, the determining unit 920 may be implemented as the remove CP module 410 and the FFT module 420, the phase reverse rotation unit 930 may be implemented as the phase reverse rotation module 430, and the post-processing unit 940 may be implemented as the P/S conversion module 440.

The apparatus 900 in FIG. 9 can be configured to implement the processes performed by the second device 220 in the foregoing embodiments. For brevity, details are not described herein again.

Figure 10:
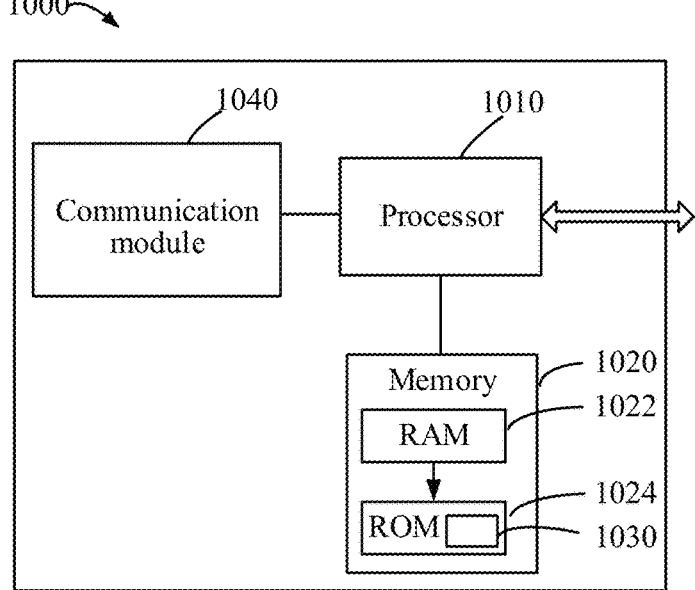
FIG. 10 is a schematic block diagram of an example device that may be configured to implement embodiments of the present disclosure.

FIG. 10 is a schematic block diagram of an example device 1000 that may be configured to implement embodiments of the present disclosure. The device 1000 may be implemented as or included in the first device 210 in FIG. 2, or the device 1000 may be implemented as or included in the second device 220 in FIG. 2. As shown in the figure, the device 1000 includes one or more processors 1010, one or more memories 1020 coupled to the processor 1010, and a communication module 1040 coupled to the processor 1010.

The communication module 1040 may be configured to perform bidirectional communication. The communication module 1040 may have at least one communication interface for communication. The communication interface may include any interface necessary for communicating with another device.

The processor 1010 may be of any type suitable for a local technology network, and may include but is not limited to at least one of the following: one or more of a general-purpose computer, a special-purpose computer, a microcontroller, a digital signal processor (DSP), or a controller-based multi-core controller architecture. The device 1000 may have a plurality of processors, such as application-specific integrated circuit chips that are slaved in time to a clock synchronized with a main processor.

The memory 1020 may include one or more non-volatile memories and one or more volatile memories. An example of the non-volatile memory includes but is not limited to at least one of the following: a read-only memory (ROM) 1024, an erasable programmable read-only memory (EPROM), a flash memory, a hard disk, a compact disc (CD), a digital versatile disc (DVD), or another magnetic storage and/or optical storage. An example of the volatile memory includes but is not limited to at least one of the following: a random access memory (RAM) 1022, or another volatile memory that does not hold in power-off duration.

A computer program 1030 includes computer-executable instructions executed by the associated processor 1010. The program 1030 may be stored in the ROM 1024. The processor 1010 may perform any suitable action and processing by loading the program 1030 into the RAM 1022.

Embodiments of the present disclosure may be implemented by using the program 1030, so that the device 1000 may perform any process discussed above. Embodiments of the present disclosure may alternatively be implemented by using hardware or a combination of software and hardware.

The program 1030 may be tangibly included in a computer-readable medium, and the computer-readable medium may be included in the device 1000 (for example, in the memory 1020) or another storage device that can be accessed by the device 1000. The program 1030 may be loaded from the computer-readable medium to the RAM 1022 for execution. The computer-readable medium may include any type of tangible nonvolatile memory, such as a ROM, an EPROM, a flash memory, a hard disk, a CD, or a DVD.

In some embodiments, the communication module 1040 in the device 1000 may be implemented as a transmitter and a receiver (or a transceiver), and the communication module 1040 may be configured to send/receive a transmitted signal or the like. In addition, the device 1000 may further include one or more of a scheduler, a controller, and a radio frequency/antenna. Details are not described in the present disclosure.

For example, the device 1000 in FIG. 10 may be implemented as a communication apparatus, or may be implemented as a chip or a chip system in a communication apparatus. This is not limited in embodiments of the present disclosure.

Embodiments of the present disclosure further provide a chip. The chip may include an input interface, an output interface, and a processing circuit. In embodiments of the present disclosure, the input interface and the output interface may complete signaling or data exchange, and a processing circuit may complete generation and processing of signaling or data information.

Embodiments of the present disclosure further provide a chip system, including a processor configured to support a device in implementing the function in any one of the foregoing embodiments. In a possible design, the chip system may further include a memory. The memory is configured to store necessary program instructions and data. When the processor runs the program instructions, a device on which the chip system is installed is enabled to perform the method in any one of the foregoing embodiments. For example, the chip system may include one or more chips, or may include a chip and another discrete device.

Embodiments of the present disclosure further provide a processor configured to be coupled to a memory. The memory stores instructions. When the processor runs the instructions, the processor is enabled to perform the method and the function in any one of the foregoing embodiments.

Embodiments of the present disclosure further provide a computer program product including instructions. When the computer program product runs on a computer, the computer is enabled to perform the method and the function in any one of the foregoing embodiments.

Embodiments of the present disclosure further provide a computer-readable storage medium. The computer-readable storage medium stores computer instructions. When a processor runs the instructions, the processor is enabled to perform the method and the function in any one of the foregoing embodiments.

Generally, various embodiments of the present disclosure may be implemented by hardware or a dedicated circuit, software, logic, or any combination thereof. Some aspects may be implemented by hardware, and other aspects may be implemented by firmware or software. The firmware or software may be performed by a controller, a microprocessor, or another device. Although aspects of embodiments of the present disclosure are shown and illustrated as block diagrams, flowcharts, or other diagrams, it should be understood that in the block diagrams described herein, the apparatuses, systems, technologies, or methods may be implemented as, for example, non-limiting examples, hardware, software, firmware, dedicated circuits or logic, general-purpose hardware or controllers, other devices, or a combination thereof.

The present disclosure further provides at least one computer program product tangibly stored on a non-transitory computer-readable storage medium. The computer program product includes computer-executable instructions, such as instructions included in a program module. The instructions are executed in a device on a real or virtual processor of a target to perform the processes/methods as shown above with reference to the figures. Generally, the program module includes a routine, a program, a library, an object, a class, a component, a data structure, and the like that execute a particular task or implement a particular abstract data type. In various embodiments, functions of program modules may be combined or a function of a program module may be split as needed. Machine-executable instructions for the program module may be executed locally or within a distributed device. In the distributed device, the program modules may be located in local and remote storage media.

Computer program code used to implement the methods disclosed in the present disclosure may be written in one or more programming languages. The computer program code may be provided for a processor of a general-purpose computer, a special-purpose computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of the present disclosure, the computer program code or related data may be carried by any appropriate carrier, so that a device, an apparatus, or a processor can perform various processing and operations described above. Examples of the carrier include a signal, a computer-readable medium, and the like. For example, the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

In addition, although the operations of the methods disclosed in the present disclosure are described in a particular order in the accompanying drawings, this does not require or imply that these operations need to be performed in the particular order or that all of the shown operations need to be performed to achieve a desired result. Instead, execution orders of the steps depicted in the flowcharts may change. Additionally or optionally, some steps may be omitted, a plurality of steps may be combined into one step for execution, and/or one step may be decomposed into a plurality of steps for execution. It should further be noted that features and functions of two or more apparatuses according to the present disclosure may be specified in one apparatus. On the contrary, features and functions of one apparatus described above may be further divided into a plurality of apparatuses for materialization.

The implementations of the present disclosure are described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. An information transmission method, comprising:
determining a plurality of first subcarrier data items on a plurality of first subcarriers of a first frequency subband;
performing a first phase rotation on each of the plurality of first subcarrier data items based on a mixing frequency and a first reference frequency corresponding to the first frequency subband;
determining a signal to be transmitted based on a plurality of first subcarrier data items obtained through first phase rotation; and
sending the signal.

2. The method according to claim 1, wherein the performing a first phase rotation comprises:
determining a first phase rotation value based on a difference between the mixing frequency and the first reference frequency; and
performing first phase rotation on each of the plurality of first subcarrier data items based on the first phase rotation value.

3. The method according to claim 1, further comprising:
determining a plurality of second subcarrier data items on a plurality of second subcarriers of a second frequency subband, wherein the first frequency subband does not overlap the second frequency subband in a frequency domain; and
performing a second phase rotation on each of the plurality of second subcarrier data items based on the mixing frequency and a second reference frequency corresponding to the second frequency subband, wherein the first reference frequency is different from the second reference frequency.

4. The method according to claim 3, wherein performing the second phase rotation comprises:
determining a second phase rotation value based on a difference between the mixing frequency and the second reference frequency; and
performing the second phase rotation on each of the plurality of second subcarrier data items based on the second phase rotation value.

5. The method according to claim 3, wherein determining the signal to be transmitted comprises:

determining the signal based on the plurality of first subcarrier data items obtained through the first phase rotation and the plurality of second subcarrier data items obtained through the second phase rotation.

6. An information transmission method, comprising:
receiving a transmitted signal;
determining a plurality of first subcarrier data items on a plurality of first subcarriers of a first frequency subband based on the transmitted signal;
performing a first phase reverse rotation on the plurality of first subcarrier data items based on a mixing frequency and a first reference frequency corresponding to the first frequency subband; and
performing post-processing on the plurality of first subcarrier data items obtained through first phase reverse rotation.

7. The method according to claim 6, wherein performing the first phase reverse rotation comprises:
determining a first phase reverse rotation value based on a difference between the first reference frequency and the mixing frequency; and
performing the first phase reverse rotation on each of the plurality of first subcarrier data items based on the first phase reverse rotation value.

8. The method according to claim 6, further comprising:
determining a plurality of second subcarrier data items on a plurality of second subcarriers of a second frequency subband based on the transmitted signal, wherein the first frequency subband does not overlap the second frequency subband in a frequency domain; and
performing a second phase reverse rotation on the plurality of second subcarrier data items based on the mixing frequency and a second reference frequency corresponding to the second frequency subband, wherein the first reference frequency is different from the second reference frequency.

9. The method according to claim 8, wherein performing the second phase reverse rotation comprises:
determining a second phase reverse rotation value based on a difference between the second reference frequency and the mixing frequency; and
performing the second phase reverse rotation on each of the plurality of second subcarrier data items based on the second phase reverse rotation value.

10. A communication apparatus, comprising:
a processor, configured to:
determine a plurality of first subcarrier data items on a plurality of first subcarriers of a first frequency subband;
perform a first phase rotation on each of the plurality of first subcarrier data items based on a mixing frequency and a first reference frequency corresponding to the first frequency subband; and
determine a signal to be transmitted based on a plurality of first subcarrier data items obtained through the first phase rotation; and
a transceiver, configured to send the signal.

11. The apparatus according to claim 10, wherein the processor is configured to:
determine a first phase rotation value based on a difference between the mixing frequency and the first reference frequency; and
perform the first phase rotation on each of the plurality of first subcarrier data items based on the first phase rotation value.

12. The apparatus according to claim 10, wherein the processor is configured to:

determine a plurality of second subcarrier data items on a plurality of second subcarriers of a second frequency subband, wherein the first frequency subband does not overlap the second frequency subband in a frequency domain; and perform a second phase rotation on each of the plurality of second subcarrier data items based on the mixing frequency and a second reference frequency corresponding to the second frequency subband, wherein the first reference frequency is different from the second reference frequency.

13. The apparatus according to claim 12, wherein the processor is configured to:

determine a second phase rotation value based on a difference between the mixing frequency and the second reference frequency; and perform the second phase rotation on each of the plurality of second subcarrier data items based on the second phase rotation value.

14. The apparatus according to claim 12, wherein the processor is configured to:

determine the signal based on the plurality of first subcarrier data items obtained through first phase rotation and a plurality of second subcarrier data items obtained through the second phase rotation.

* * * * *